(12) United States Patent
Karlberg (10) Patent No.: US 8,229,394 B2
(45) Date of Patent: Jul. 24, 2012

(54) METHODS, DEVICES AND COMPUTER PROGRAM PRODUCTS FOR TRACKING USAGE OF A NETWORK BY A PLURALITY OF USERS OF A MOBILE PHONE

(75) Inventor: Johan Karlberg, Lund (SE)

(73) Assignee: Sony Ericsson Mobile Communications AB, Lund (SE)

( * ) Notice: Subject to any disclaimer, the term of this patent is extended or adjusted under 35 U.S.C. 154(b) by 1007 days.

(21) Appl. No.: 11/565,187

(22) Filed: Nov. 30, 2006

(65) Prior Publication Data

US 2008/0132201 A1  Jun. 5, 2008

(51) Int. Cl.
H04M 11/00 (2006.01)
H04M 15/00 (2006.01)
(52) U.S. Cl. .................... 455/407; 455/406; 379/114.01
(58) Field of Classification Search .................. 455/407, 455/406, 405, 411; 379/88.02, 130; 705/14, 705/26; 713/183, 184
See application file for complete search history.

(56) References Cited

U.S. PATENT DOCUMENTS

| | | | |
|---|---|---|---|
| 6,524,189 B1 | 2/2003 | Rautila | |
| 6,542,758 B1 | 4/2003 | Chennakeshu et al. | |
| 2002/0022472 A1* | 2/2002 | Watler et al. | 455/405 |
| 2003/0190908 A1* | 10/2003 | Craven | 455/411 |
| 2004/0243477 A1* | 12/2004 | Mathai et al. | 705/26 |
| 2006/0019630 A1* | 1/2006 | Sposato et al. | 455/406 |
| 2008/0020803 A1* | 1/2008 | Rios et al. | 455/565 |

FOREIGN PATENT DOCUMENTS

| | | |
|---|---|---|
| EP | 1225774 A1 | 1/2001 |
| GB | 2315954 A | 2/1998 |
| WO | WO 92/19078 A1 | 10/1992 |
| WO | WO 02/08863 A2 | 1/2002 |
| WO | WO 02/060203 A1 | 8/2002 |

OTHER PUBLICATIONS

"Nokia Introduces New Cost Control Solution for Prepaid Services", http://money.cnn.com/services/tickerheadlines/prn/200610180558PR_NEWS_USPR_UKW005.htm (Oct. 2006).
Notification of Transmittal of the International Search Report and the Written Opinion of the International Searching Authority, or the Declaration corresponding to PCT/EP2007/055121 mailed Aug. 31, 2007.

* cited by examiner

*Primary Examiner* — George Eng
*Assistant Examiner* — Nizar Sivji
(74) *Attorney, Agent, or Firm* — Myers Bigel Sibley & Sajovec, P.A.

(57) ABSTRACT

Methods for tracking usage of a network by a plurality of users of a mobile phone include associating a plurality of user accounts with the mobile phone, where ones of the plurality of user accounts correspond to ones of the plurality of users of the mobile phone. Usage of the network by the mobile phone is automatically attributed to one of the plurality of user accounts responsive to receiving identifying information for a corresponding one of the plurality of users of the mobile phone. Charges for the one of the plurality of user accounts are calculated based on the usage attributed to the one of the plurality of user accounts. Related devices and computer program products are also discussed.

26 Claims, 4 Drawing Sheets

METHODS, DEVICES AND COMPUTER PROGRAM PRODUCTS FOR TRACKING USAGE OF A NETWORK BY A PLURALITY OF USERS OF A MOBILE PHONE

FIELD OF THE INVENTION

The present invention relates to communications networks, and, more particularly, to methods and devices for tracking usage of communications networks.

BACKGROUND OF THE INVENTION

Communications networks are widely used for nationwide and worldwide communication of voice, multimedia, and/or other data. As used herein, communications networks may include public communications networks, such as the public switched telephone network (PSTN), terrestrial and/or satellite cellular networks, and/or the Internet.

Mobile phones are widely used to access communications networks to provide a variety of voice, data, and/or multimedia communications capabilities. However, in many developing countries, it may be difficult to provide affordable access to communications networks. For example, many remote areas may be without access to fixed land lines. Accordingly, businesses have developed for providing wireless communication services to villages and/or other rural areas that may not have access to fixed land line-based communications networks. In such business arrangements, a mobile phone may be shared and/or rented by multiple users, who may pay for the use of the mobile phone on a per-call or per-minute basis.

For example, GrameenPhone's Village Phone Program works as an owner-operated GSM payphone. Village Phone Operators (VPOs) may take loans from GrameenBank to subscribe to GrameenPhone, and may be trained on how to operate the mobile phones and how to charge others for use of the mobile phones at a profit. Many VPOs may be women living in remote areas where telecommunications services did not previously exist. The VPOs may rent the use of a phone to their community on a per-call basis, and may pay a portion of the rental fees back to GrameenPhone. The VPOs may provide affordable rates to their patrons, while earning enough to repay their loans and earn profits. Thus, those who cannot afford to own their own personal mobile phone and/or become regular network subscribers may access a wireless communications network by renting a mobile phone that is shared by multiple users.

SUMMARY OF THE INVENTION

According to some embodiments of the present invention, a method for tracking usage of a network by a plurality of users of a mobile phone includes associating a plurality of user accounts with the mobile phone. Ones of the plurality of user accounts correspond to ones of the plurality of users of the mobile phone. Usage of the network by the mobile phone is automatically attributed to one of the plurality of user accounts responsive to receiving identifying information for a corresponding one of the plurality of users of the mobile phone. Also, charges for the one of the plurality of user accounts are automatically calculated based on the usage attributed to the one of the plurality of user accounts.

In some embodiments, the mobile phone may be configured to provide voice transmission over a wide-area network. In addition, the mobile phone may be configured to provide the voice transmission based on a Global System for Mobile communications (GSM) standard.

In other embodiments, usage units associated with the communication connection may be determined. The usage units associated with the communication connection may be automatically attributed to the one of the plurality of user accounts as the usage of the network.

In some embodiments, the usage units may include a number of sent and/or received calls, a number of sent and/or received text messages, a number of sent and/or received picture messages, an amount of sent and/or received data, and/or a time of and/or a duration of the communication connection.

In other embodiments, the wireless wide-area network communication connection may be established as associated with the one of the plurality of user accounts. For example, a log on request including the identifying information may be received from a current user of the mobile phone via a user interface of the mobile phone. The current user may be authenticated as one of the plurality of users based on the identifying information. A plurality of wireless wide-area network connections respectively including associated usage units may be established as associated with the one of the plurality of users accounts corresponding to the one of the plurality of users. Also, a log off request may be received from the current user of the mobile phone via the user interface of the mobile phone. A sum of the usage units between receiving the log on request and receiving the log off request may be automatically attributed to the one of the plurality of user accounts as the usage of the network.

In other embodiments, use of the mobile phone may be prevented responsive to a failure in authenticating the current user as one of the plurality of users. In addition, the log out request may be automatically generated if no usage occurs within a predetermined time after authenticating.

In other embodiments, usage information based on the usage units attributed to the one of the plurality of user accounts may be stored. For example, the usage information may be stored with user account data for the one of the plurality of user accounts in a memory of the mobile phone.

In some embodiments, usage information based on the usage units attributed to the one of the plurality of user accounts and/or the charges for the one of the plurality of user accounts may be displayed. For example, a usage summary based on the usage information for the one of the plurality of user accounts associated with the mobile phone may be displayed responsive to receiving a request therefor. In addition, a detailed usage listing based on the usage information for the one of the plurality of user accounts associated with the mobile phone may be displayed responsive to receiving a request therefor.

In other embodiments, the charges for the one of the plurality of user accounts may be automatically calculated based on the usage units attributed to the one of the plurality of user accounts and a predetermined pricing scheme. For example, the predetermined pricing scheme may include a predetermined network tariff rate. The predetermined network tariff rate may be downloaded, and the charges may be automatically calculated based on the predetermined network tariff rate.

In some embodiments, the one of the plurality of user accounts may be associated with a pre-paid spending limit. As such, further usage of the network by the mobile phone may be prevented when the charges for the one of the plurality of user accounts are greater than or equal to the pre-paid spending limit.

In other embodiments, the mobile phone may be associated with a plurality of broadcast identifiers respectively corresponding to the plurality of user accounts. One of the plurality of broadcast identifiers corresponding to the one of the plurality of user accounts may be activated responsive to receiving the identifying information for the corresponding one of the plurality of users of the mobile phone.

In some embodiments, the usage of the network may be automatically attributed to the one of the plurality of user accounts based on a corresponding one of a plurality of broadcast identifiers that is broadcast from the mobile phone at a time of the usage.

In other embodiments, the usage of the network may be automatically attributed to the one of the plurality of user accounts based on information received from one or more network elements. In other embodiments, the usage of the network may be automatically attributed to the one of the plurality of user accounts based on information received from the mobile phone.

In some embodiments, usage units associated with a wireless wide-area network connection established by the mobile phone may be stored including a corresponding time of the communication connection. The usage units may be correlated to the one of the plurality of user accounts based on a time of receipt of the identifying information for the one of the plurality of users of the mobile phone and based on the time of the communication connection.

In other embodiments, the usage of the network may be automatically attributed to ones of the plurality of user accounts responsive to receiving identifying information for corresponding ones of the plurality of users. Also, charges for the ones of the plurality of user accounts may be automatically calculated based on the usage attributed to the ones of the plurality of user accounts.

In some embodiments, ones of the plurality of user accounts associated with the mobile phone may be billed based on the usage attributed to the ones of the plurality of user accounts.

According to other embodiments of the present invention, a method of operating a mobile phone configured to be shared by a plurality of users includes associating ones of a plurality of broadcast identifiers with respective ones of the plurality of users of the mobile phone. Identifying information for one of the plurality of users of the mobile phone is received via a user interface of the mobile phone. A corresponding one of the plurality of broadcast identifiers is activated responsive to receiving the identifying information for the one of the plurality of users.

In some embodiments, a plurality of user accounts may be associated with the mobile phone. Ones of the plurality of user accounts may correspond to respective ones of the plurality of broadcast identifiers.

In other embodiments, the plurality of broadcast identifiers may be a plurality of mobile identification numbers associated with the mobile phone. A corresponding one of the plurality of mobile identification numbers may be broadcast responsive to receiving the identifying information for the associated one of the plurality of users.

According to further embodiments of the present invention, a mobile phone includes a transceiver and a controller. The transceiver is configured to establish a wireless wide-area network connection. The controller is configured to associate a plurality of user accounts with the mobile phone. The controller is also configured to automatically attribute usage of a network by the mobile phone to one of the plurality of user accounts responsive to receiving identifying information for a corresponding one of a plurality of users of the mobile phone. In addition, the controller is configured to automatically calculate charges for the one of the plurality of user accounts based on the usage attributed to the one of the plurality of user accounts.

In some embodiments, the mobile phone may be configured to provide voice transmission over a wide-area network. In addition, the mobile phone may be further configured to provide the voice transmission based on a Global System for Mobile communications (GSM) standard.

In other embodiments, the controller may be configured to determine usage units associated with the communication connection and automatically attribute the usage units associated with the communication connection to the one of the plurality of user accounts as the usage of the network.

In some embodiments, the mobile phone may include a user interface configured to receive a log on request including the identifying information from a current user of the mobile phone and configured to receive a log off request from the current user of the mobile phone. The controller may be configured to authenticate the current user as one of the plurality of users based on the identifying information. In addition, the controller may be configured to establish a plurality of wireless wide-area network communication connections respectively including usage units associated therewith as associated with the one of the plurality of user accounts corresponding to the one of the plurality of users. Also, the controller may be configured to automatically attribute a sum of the usage units between receipt of the log on request and receipt of the log off request to the one of the plurality of user accounts as the usage of the network.

In other embodiments, the controller may be configured to prevent use of the mobile phone if the controller is unable to authenticate the current user as one of the plurality of users. In addition, the controller may be configured to automatically generate the log out request if no usage occurs within a predetermined time after authentication.

In some embodiments, the mobile phone may include a memory unit configured to store user account data for the one of the plurality of user accounts. The user account data may include usage information based on the usage units attributed to the one of the plurality of user accounts.

In other embodiments, the user interface may be configured to display the usage information based on the usage units attributed to the one of the plurality of user accounts and/or charges for the one of the plurality of user accounts. For example, the user interface may be configured to display a usage summary based on the usage information for the one of the plurality of user accounts associated with the mobile phone. In addition, the user interface may be configured to display a detailed usage listing based on the usage information for the one of the plurality of user accounts associated with the mobile phone.

In some embodiments, the controller may be configured to automatically calculate the charges for the one of the plurality of user accounts based on the usage units attributed to the one of the plurality of user accounts and a predetermined pricing scheme.

In other embodiments, the predetermined pricing scheme may include a predetermined network tariff rate. The transceiver may be configured to download the predetermined network tariff rate, and the controller may be configured to automatically calculate the charges based on the predetermined network tariff rate.

In some embodiments, the memory unit may be configured to store a pre-paid spending limit associated with the one of the plurality of user accounts. The controller may be configured to prevent further usage of the network by the mobile phone when the charges for the one of the plurality of user accounts are greater than or equal to the pre-paid spending limit.

In other embodiments, the controller may be configured to automatically attribute the usage of the network to ones of the plurality of user accounts responsive to receiving identifying information for corresponding ones of the plurality of users. The controller may also be configured to automatically calculate the charges for the ones of the plurality of user accounts based on the usage attributed to the ones of the plurality of user accounts.

According to still further embodiments of the present invention, a mobile phone includes a user interface configured to receive identifying information for one of a plurality of users of the mobile phone. The mobile phone also includes a controller configured to associate ones of a plurality of broadcast identifiers with respective ones of the plurality of users of the mobile phone, and activate a corresponding one of the plurality of broadcast identifiers based on receipt of the identifying information for the one of the plurality of users.

In some embodiments, the plurality of broadcast identifiers may be a plurality of mobile identification numbers associated with the mobile phone. The mobile phone may further include a transceiver configured to establish a wireless wide-area network connection and broadcast the corresponding one of the plurality of mobile identification numbers responsive to activation thereof by the controller.

DETAILED DESCRIPTION OF EMBODIMENTS OF THE INVENTION

Specific exemplary embodiments of the invention now will be described with reference to the accompanying drawings. This invention may, however, be embodied in many different forms and should not be construed as limited to the embodiments set forth herein; rather, these embodiments are provided so that this disclosure will be thorough and complete, and will fully convey the scope of the invention to those skilled in the art. The terminology used in the detailed description of the particular exemplary embodiments illustrated in the accompanying drawings is not intended to be limiting of the invention. In the drawings, like numbers refer to like elements.

As used herein, the singular forms "a", "an" and "the" are intended to include the plural forms as well, unless expressly stated otherwise. It will be further understood that the terms "includes," "comprises," "including" and/or "comprising," when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may include wirelessly connected or coupled. As used herein, the term "and/or" includes any and all combinations of one or more of the associated listed items.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the present specification and/or the relevant art, and will not be interpreted in an idealized or overly formal sense unless expressly so defined herein.

As used herein, a "mobile phone" may include cellular or other communications devices with or without a multi-line display; Personal Communications System (PCS) terminals that may combine a voice and data processing, facsimile and/or data communications capabilities; Personal Digital Assistants (PDA) that include a radio frequency receiver and a pager, Internet/Intranet access, Web browser, organizer, calendar and/or a global positioning system (GPS) receiver; and/or other appliances that include a radio frequency transceiver configured to establish a wide-area network connection for voice transmission.

Embodiments of the present invention will now be described with reference to FIGS. 1-4. Some embodiments of the present invention may arise from a realization that, when a mobile phone is shared by multiple users, it may be difficult to account for network usage on a per-user basis in order to individually bill the users of the mobile phone. For example, while it is known to provide network-based systems for tracking usage of the network by a mobile phone, these systems may be unable to attribute the usage of the network among different users of the same mobile phone. Accordingly, some embodiments of the present invention provide methods, devices, and computer program products configured to track usage of a network by multiple users of a mobile phone.

Figure 1:
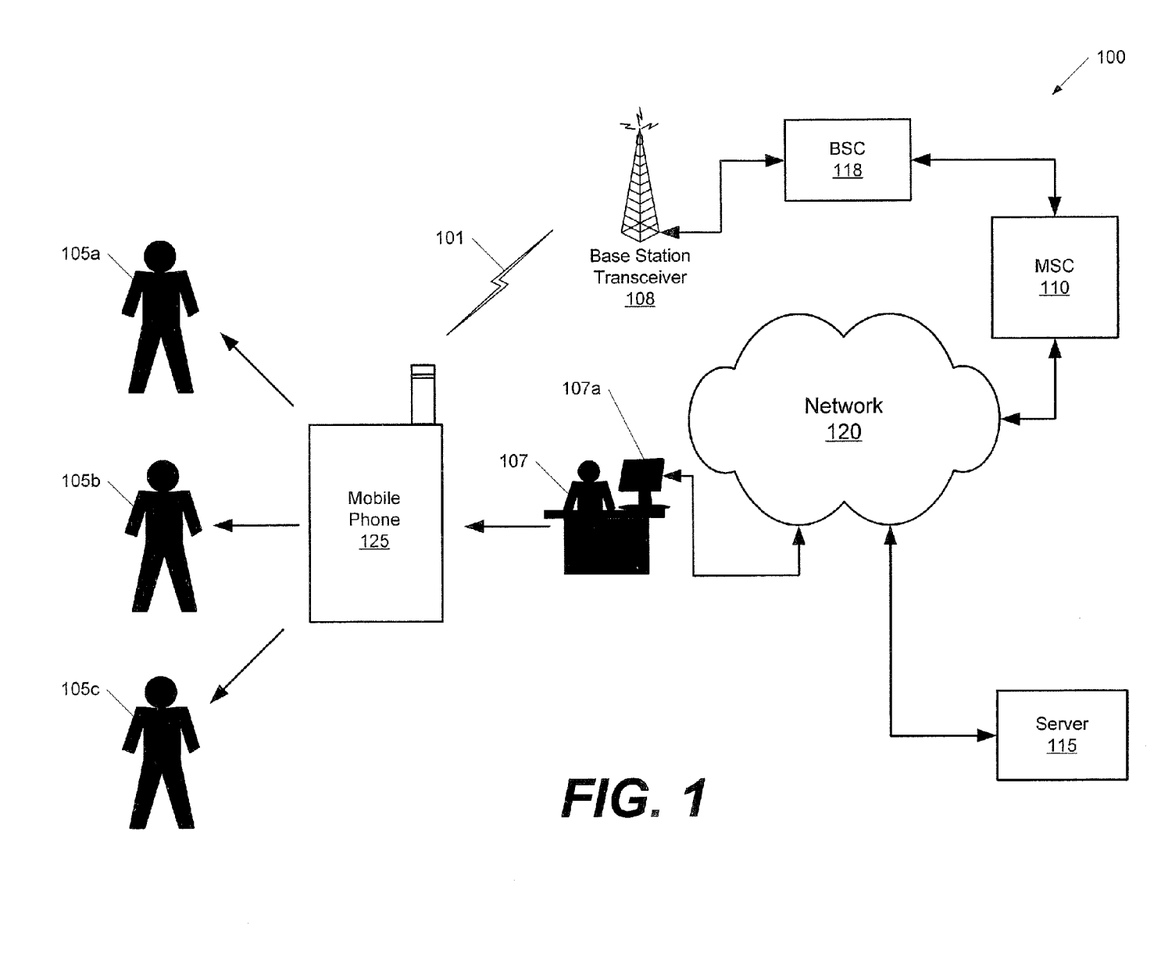
FIG. 1 is a block diagram illustrating a system for tracking usage of a network by a plurality of users of a mobile phone according to some embodiments of the present invention.

FIG. 1 is a block diagram illustrating a communications system 100 that may be used to track usage of a network by a plurality of users of a mobile phone according to some embodiments of the present invention. In some embodiments of the present invention, the communications system 100 may be part of a wide-area cellular network. Referring now to FIG. 1, the system 100 includes a mobile phone 125 that is configured to establish a wireless wide-area network communication connection 101 to access a wireless network, such as a cellular network, via a base station transceiver 108 and a Base Station Controller (BSC) 118. For example, the mobile phone 125 may be configured to operate according to a Global System for Mobile communications (GSM) standard to provide voice transmission over the wireless wide-area network connection. The communications system 100 may further include a wide-area network (WAN) 120, a Mobile Switching Center (MSC) 110, one or more remote servers 115, and/or other network elements as are well-known in the art.

The wide-area network (WAN) 120 is a telecommunications network that spans a relatively large geographic area. As used herein, a WAN distinguishes a broader telecommunications structure from a local area network (LAN). As such, a WAN excludes Bluetooth, infrared (IR), and/or other short-range network connections between devices. Typically, a WAN includes two or more LANs. Devices connected to a WAN are often connected through public and/or private networks, leased lines, and/or satellites. More particularly, WANs may be connected using the public-switched telephone network (PSTN), ISDN (integrated services digital network), frame relay, ATM (a synchronous transfer mode), and/or other high speed services.

As shown in FIG. 1, a plurality of users 105a-105c may use the mobile phone 125 to access the wireless network. For example, in some embodiments, the plurality of users 105a-105c may rent the mobile phone 125 from a business owner 107, such as a Village Phone Operator (VPO), in order to affordably access the wireless network. More particularly, the mobile phone 125 may be associated with a plurality of user accounts that correspond to the plurality of users 105a-105c, respectively. For example, the owner 107 may store user account data for each of the plurality of users 105a-105c in a memory of the mobile phone 125, in the remote server 115, and/or in a local computer 107a associated with the business owner 107. The mobile phone 125 may also be configured to receive identifying information for one of the plurality of users 105a-105c, for example, via a user interface. For instance, the identifying information may be included as a user identification and/or password in a log on request. Based on this identifying information, usage of the wireless network by the mobile phone 125 may be automatically attributed to one of the plurality of user accounts. In addition, charges for each user account may be automatically calculated based on the usage of the wireless network attributed to each of the user accounts.

In some embodiments, the mobile phone 125 itself may be configured to track usage of the wireless network by the users 105a-105c. More particularly, the mobile phone 125 may be configured to receive a log on request including the identifying information from a current one of the users 105a-105c via the user interface. The mobile phone 125 may be configured to authenticate the current user as one of the users 105a-105c based on the identifying information, and may also be configured to receive a log off request from the current user via the user interface. The mobile phone 125 may thus automatically attribute the usage of the wireless network that occurs between receiving the log on request and receiving the log off request to the user account corresponding to the current one of the users 105a-105c.

More particularly, the mobile phone 125 may be configured to establish one or more wireless wide-area network communication connections 101 to access the wireless network, and may be configured to automatically attribute usage to one or more corresponding user accounts based on the usage of the communication connection(s) 101. For example, the mobile phone 125 may be configured to automatically attribute usage units associated with the communication connection(s) 101 to the user account corresponding to the current one of the users 105a-105c. The usage units may be used to represent the usage of the communication connection(s) 101, for instance, for billing purposes. For example, the usage units may represent a number of sent and/or received calls, a number of sent and/or received text messages, a number of sent and/or received picture messages, an amount of sent and/or received data, and/or time(s) and/or duration(s) of the wireless communication connection(s) 101. The mobile phone 125 may also be configured to automatically calculate the charges for each of the user accounts based on the usage attributed to each user account. For example, the mobile phone 125 may be configured to automatically calculate the charges for each user account based on the usage units for the wireless communication connection(s) 101 associated with each of the user accounts. In addition, the mobile phone 125 may be configured to store and/or display usage information for each user account based on the attributed usage units. As such, the business owner 107 may individually bill the users 105a-105c for their respective usage of the wireless network based on the user account data stored in the mobile phone 125.

For example, the business owner 107 may own the mobile phone 125 as part of a business of renting phones to users in a small village. As such, if the user 105a needs to make a call and/or check his voicemail and/or e-mail, the business owner 107 may associate a user account that corresponds to the user 105a with the mobile phone 125, and may rent the mobile phone 125 to the user 105a. The user 105a may thereby log on to his user account, check his voicemail, send e-mail, log off, and may return the mobile phone 125 to the business owner 107. The mobile phone 125 may attribute this usage to the user account corresponding to the user 105a. The business owner 107 may thus track the usage attributed to the user account and the corresponding charges by using the mobile phone 125, and may bill the user 105a for the usage. In addition, the next time the user 105a wishes to rent the mobile phone 125, he may log in to his pre-existing user account, which may be stored in the memory of the mobile phone 125.

Still referring to FIG. 1, in other embodiments, the system 100 may be configured to track usage of the wireless network by the users 105a-105c of the mobile phone 125 via one or more network entities, such as the server 115. For example, the server 115 may be configured to receive a log on request including the identifying information from a current one of the users 105a-105c of the mobile phone 125 via the user interface of the mobile phone 125. The server 115 may be configured to authenticate the current user as one of the plurality of users 105a-105c based on the identifying information, and may also be configured to receive a log off request from the current one of the users 105a-105c via the user interface of the mobile phone 125. As such, the server 115 may be configured to automatically attribute the usage that occurs between receiving the log on request and receiving the log off request to the user account corresponding to the current one of the users 105a-105c. For example, the server 115 may automatically attribute usage units associated with the communication connection(s) 101 to the user account corresponding to the current one of the users 105a-105c. In addition, the server 115 may be configured to automatically calculate the charges for the user accounts based on the usage attributed to each of the user accounts.

The server 115 may also be configured to automatically attribute the usage of the wireless network to one of the user accounts based on information received from one or more network elements and/or from the mobile phone 125 itself. For example, one or more network elements may be configured to store usage units associated with one or more wireless wide-area network communication connections established using the mobile phone 125, including corresponding times of the communication connection(s). As such, the server 115 may be configured to correlate the usage units to one or more of the user accounts based on the time of the communication connection(s) and based on the time(s) of receipt of the identifying information for a corresponding one of the users 105a-105c. For example, a network element may indicate that the mobile phone 125 downloaded 180 kb of data at 3:05 pm on November 19, and downloaded 240 kb of data at 9:30 am on November 20. The server 115 may store log on/log off information indicating that the user 105a was logged on from 3:00 pm-3:15 pm on November 19, and that the user 105b was logged on from 9:00 am-9:45 am on November 20. As such, the server 115 may correlate the downloading of the 180 kb of data to the user account corresponding to the user 105a, and may correlate the downloading of 240 kb of data to the user account corresponding to the user 105b. Accordingly, the server 115 may also calculate the charges to the plurality of user accounts based on the correlation. In addition, the server 115 may be configured to prevent more than one of the users 105a-105c from being logged on at the same time.

Still referring to FIG. 1, the server 115 may be configured to provide the attributed usage for each user account associated with the mobile phone 125 and/or the charges for each user account to the business owner 107 via the network 120. As such, the network service provider may bill the business owner 107 for the overall usage of the wireless network by the mobile phone 125, and the business owner 107 may bill each of the user accounts associated with the users 105a-105c of the mobile phone 125 based on their individual usage of the wireless network. In addition, in some embodiments, the network service provider may directly bill the users 105a-105c based on their individual usage of the wireless network.

In some embodiments, the mobile phone 125 may include a plurality of broadcast identifiers, such as a plurality of mobile identification numbers (MINs). Each of the broadcast identifiers may be associated with one of the users 105a-105c of the mobile phone 125 and/or their corresponding user accounts. As such, the mobile phone 125 may be configured to activate one of the broadcast identifiers responsive to receiving identifying information for a corresponding one of the users 105a-105c via the user interface. Accordingly, a network device, such as the BSC 118, may be configured to automatically attribute usage of the wireless network to a particular user account based on the broadcast identifier that is broadcast from the mobile phone 125 at a time of the usage.

Although FIG. 1 illustrates exemplary systems for tracking usage of a network by a plurality of users of a mobile phone, it will be understood that the present invention is not limited to such configurations, but is intended to encompass any configuration capable of carrying out the operations described herein. For example, although the communications system 100 is described above primarily with reference to particular functionality implemented by the mobile phone 125 and the remote server 115, it is to be understood that this functionality may be implemented by a combination of devices in coordination to track usage of the wireless network by a plurality of users. As such, particular functionality described above with reference to the mobile phone 125 may be implemented by the server 115 and/or other network elements in some embodiments. Likewise, particular functionality described above with reference to the server 115 may be implemented by the mobile phone 125 and/or other network elements in some embodiments. More generally, the functionalities of the mobile phone 125 and the server 115 may depend on the particular configuration of the system for tracking usage of the wireless network by a plurality of users of the mobile phone 125 according to some embodiments of the present invention.

Figure 2A:
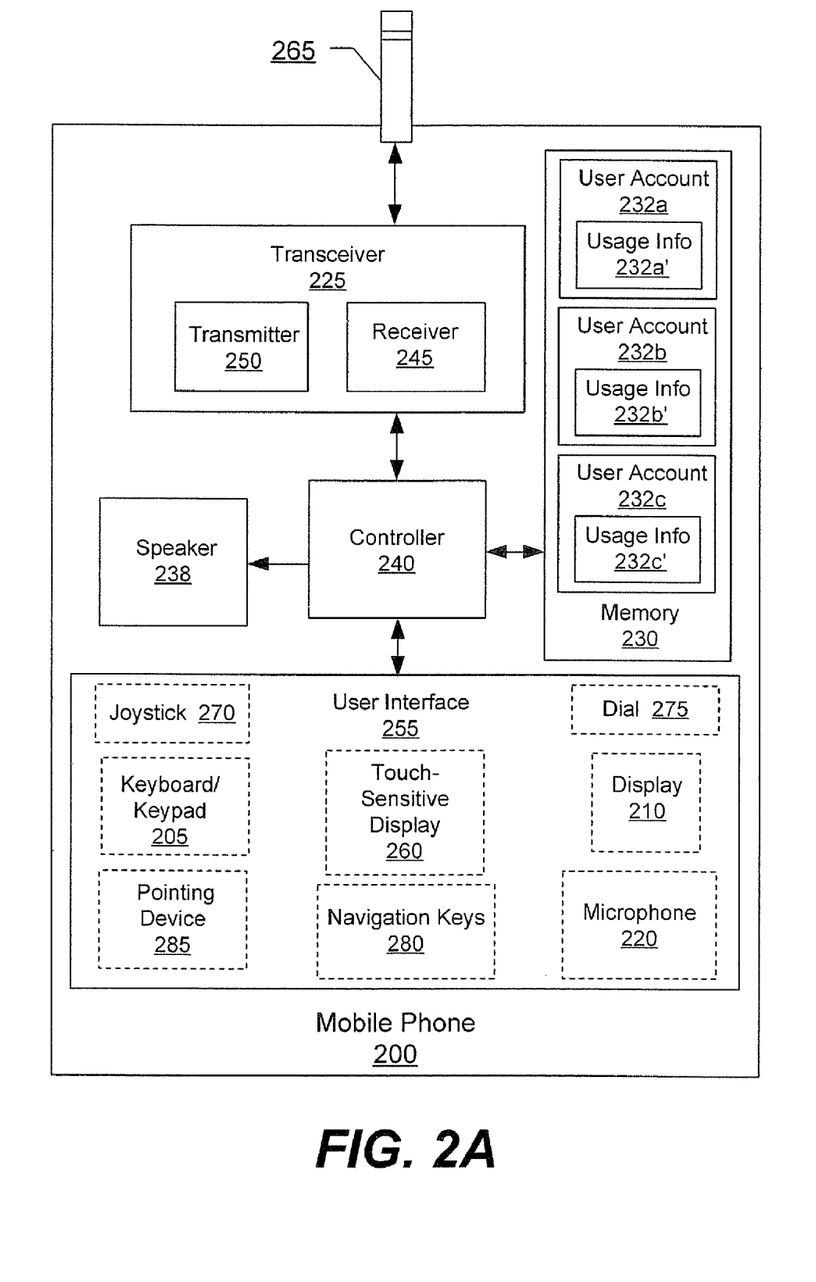
FIGS. 2A and 2B are block diagrams illustrating mobile phones configured to track usage of a network by a plurality of users according to some embodiments of the present invention.
Figure 2B:
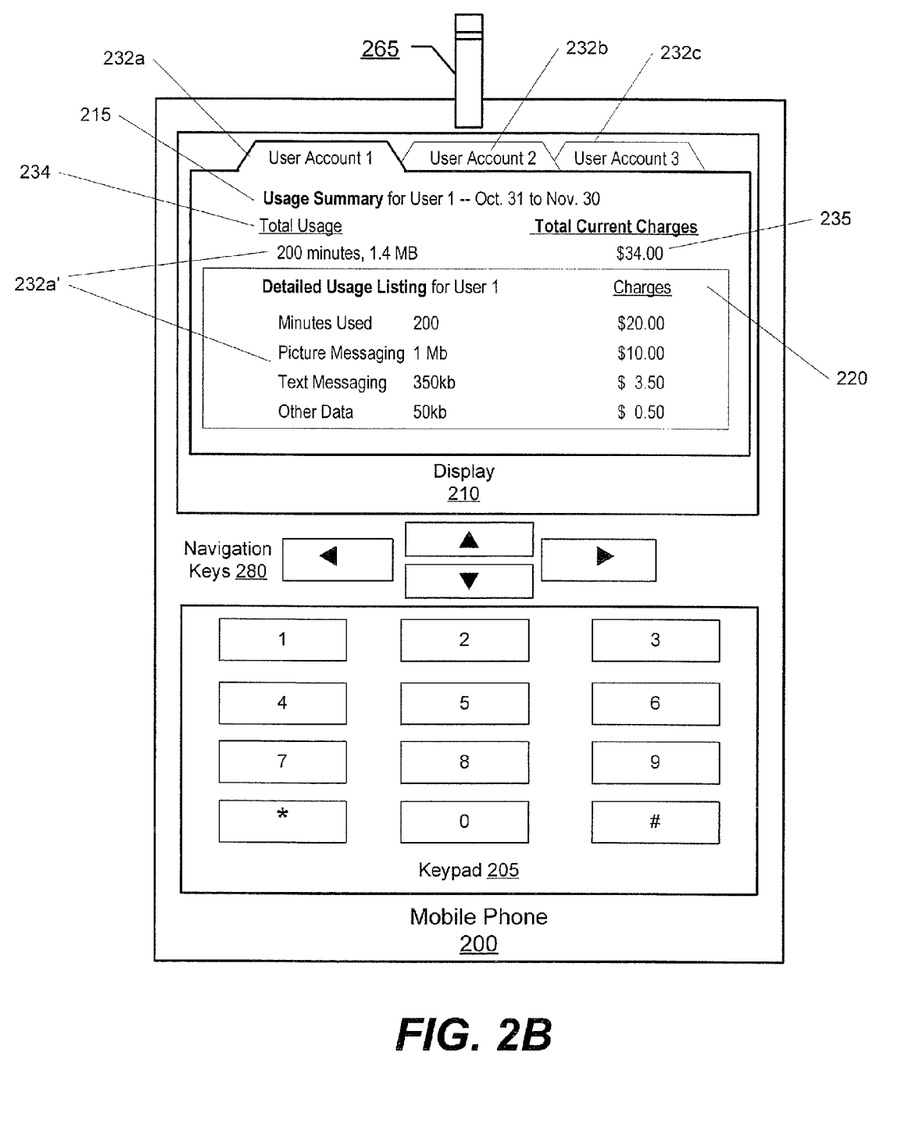

FIGS. 2A and 2B are block diagrams illustrating a mobile phone 200 configured to track usage of a network by a plurality of users of the mobile phone 200 according to some embodiments of the present invention. In some embodiments, the mobile phone 200 may correspond to the mobile phone 125 of FIG. 1. As shown in FIG. 2A, the mobile phone 200 includes a transceiver 225, an antenna 265, a controller 240, a memory 230, a speaker 238 and a user interface 255. Depending on the functionalities offered by the mobile phone 200, the user interface 255 may include a microphone 220, a display 210 (such as a liquid crystal display), a joystick 270, a keypad 205, a touch sensitive display 260, a dial 275, navigation/directional keys 280, and/or a pointing device 285 (such as a mouse, track ball, touch pad, etc.). However, additional and/or fewer elements of the user interface 255 may actually be provided. For example, the touch sensitive display 260 may be provided in a personal digital assistant (PDA) that does not include a display 210, a keypad 205, and/or a pointing device 285.

The transceiver 225 includes a transmitter circuit 250 and a receiver circuit 245, which transmit and receive radio frequency signals via the antenna 265. The radio frequency signals may include both traffic and control signals (e.g., paging signals/messages for incoming calls), which may be used to establish and maintain communication connections with other devices. The transceiver 225 may include a public land mobile network (PLMN) transceiver and/or a wireless modem. As such, the mobile phone 200 may use the PLMN transceiver and/or the wireless modem to establish a wireless wide-area network communication connection via a base station of a wide-area network, such as a PLMN. The wide-area network connection may be a packet-switched connection, such as that provided by the Enhanced Data GSM Environment (EDGE) standard, the General Packet Radio Service (GPRS) standard, and/or the Universal Mobile Telecommunications System (UMTS) standard. In addition, the mobile phone 200 may use the transceiver 225 to establish the wireless wide-area network communication connection through the base station of a WAN using a circuit-switched connection. The WAN may represent a global network, such as the Internet, or other public and/or private wide area network.

The memory 230 may represent a hierarchy of memory that may include volatile and/or nonvolatile memory, such as removable flash, magnetic, and/or optical rewritable nonvolatile memory. As shown in FIG. 2A, the memory 230 may be configured to store a plurality of user accounts 232a-232c. Each of the user accounts 232a-232c may correspond to a different user of the mobile phone 200, such as the users 105a-105c of FIG. 1. The user accounts 232a-232c may also include usage information 232a'-232c', respectively, which may represent the usage of the wireless network attributed to the different users of the mobile phone 200. The usage information may be based on usage units associated with one or more wireless wide-area network communication connections established via the transceiver 225. The usage units may represent a number of sent and/or received calls, a number of sent and/or received text messages, a number of sent and/or received picture messages, an amount of sent and/or received data, and/or times and/or durations of the wireless communication connections. As such, the usage information may include listings of dialed phone numbers, sent and/or received calls, sent and/or received text messages, sent and/or received picture messages, sent and/or received data, durations of the usage, and/or times of the usage. In some embodiments, data may be tagged with the time of transmission and/or reception, and calls may be tagged with associated dialing prefixes, such as country codes, area codes, and/or operator codes.

Still referring to FIG. 2A, the controller 240 is coupled to the transceiver 225, the memory 230, the speaker 238, and the user interface 255. The processor 240 may be, for example, a commercially available or custom microprocessor configured to coordinate and manage operations of the transceiver 225, the memory 230, the speaker 238, and/or the user interface 255. As such, the controller 240 may be configured to associate the user accounts 232a-232c with the mobile phone 200, and may automatically attribute usage of a wireless network by the mobile phone 200 to one of the user accounts 232a-232c responsive to receiving identifying information for a corresponding user.

More specifically, the user interface 255 may be configured to receive a log on request including the identifying information from a current user of the mobile phone. The controller 240 may be configured to authenticate the current user as corresponding to one of the user accounts 232a-232c based on the identifying information, for example, using one or more well-known authentication techniques. As such, the controller 240 may automatically attribute any usage that occurs after successful authentication of the current user to the corresponding one of the user accounts 232a-232c. For example, the transceiver 225 may be configured to establish one or more wireless wide-area network communication connections via a wide-area network responsive to successful authentication of the current user, and the controller 240 may be configured to automatically attribute usage units associated with the wireless communication connection(s) to the corresponding one of the user accounts 232a-232c based on the authentication. The usage units may be based on a number of sent and/or received calls, a number of sent and/or received text messages, a number of sent and/or received picture messages, an amount of sent and/or received data, and/or the time(s) and/or duration(s) of the wireless communication connection(s). In addition, the user interface 255 may be configured to receive a log off request from the current user of the mobile phone 200, and the controller 240 may be configured to automatically attribute the usage that occurs between receipt of the log on request and receipt of the log off request to the corresponding one of the user accounts 232a-232c. In some embodiments, the controller 240 may be configured to automatically generate the log off request if no usage occurs within a predetermined time after authentication.

In addition, the controller 240 may be configured to prevent use of one or more functions of the mobile phone 200 if the controller 240 is unable to authenticate the current user as corresponding to one of the user accounts 232a-232c. For example, the controller 240 may be configured to disable use of the transceiver 225 if authentication of the current user is unsuccessful. In some embodiments, the controller 240 may be configured to disable all use of the mobile phone 200 if the controller 240 is unable to successfully authenticate the current user.

Furthermore, the controller 240 may be configured to automatically calculate charges for the user accounts 232a-232c based on the usage attributed to the user accounts 232a-232c. More particularly, the controller 240 may automatically calculate the charges for the user accounts 232a-232c based on the usage information 232a'-232c' (and/or the corresponding usage units) and a predetermined pricing scheme. The pricing scheme may include a network traffic component, which may be based on a network tariff rate determined by the network provider, and a profit component, which may be determined by the owner of the mobile phone. For example, the transceiver 225 may be configured to download the network tariff rate from the network, and the controller 240 may be configured to automatically calculate the charges to each of the user accounts 232a-232c based on the usage information 232a'-232c', the network tariff rate, and the desired profit. The controller 240 may download the network tariff rate responsive to receiving a user request and/or automatically, for example, upon changes in the tariff rate and/or at other predetermined times. In addition, the memory 230 may be configured to store a pre-paid spending limit associated with one or more of the user accounts 232a-232e. As such, the controller 240 may be configured to prevent further usage of the network by the mobile phone 200 when the charges for the active one of the user accounts 232a-232c are greater than or equal to the pre-paid spending limit for that account.

FIG. 2B is a block diagram further illustrating a mobile phone 200 configured to track usage of a network by a plurality of users according to some embodiments of the present invention. As shown in FIG. 2B, output from a network usage application may be accessed and viewed on the mobile phone 200 via the display 210 of the user interface 255. For example, the network usage application may be stored in the memory 230 of the mobile phone 200. The network usage application is configured to present the usage information 232a'-232c' for the user accounts 232a-232c corresponding to one or more users of the mobile phone 200 on the display 210. More particularly, as shown in FIG. 2B, the network usage application presents current usage information 232a' for User Account 1 232a. Current usage information for other user accounts, such as User Account 2 232b and User Account 3 232c, may also be viewed on the display 210 by selecting the corresponding tabs. Although illustrated with reference to three user accounts, usage information for fewer or more user accounts may be presented at the mobile phone 200 using the network usage application.

Still referring to FIG. 2B, the current usage information 232a' for User Account 1 232a includes a Usage Summary 215 and a Detailed Usage Listing 220. The Usage Summary 215 presents the total usage 234 of the network for a predetermined period of time, as well as the total current charges 235 for User Account 1 232a for the predetermined period of time. As shown in FIG. 2B, the Usage Summary 215 shows that a total of 200 minutes and 1.4 Megabytes (MB) of data was attributed to User Account 1 232a during the period between October 31 and November 30. The Usage Summary 215 also displays the total charges for the period between October 31 and November 30 as $34.00. The Detailed Usage Listing 220 presents more specific usage information for the predetermined period of time. For example, the Detailed Usage Listing 220 shows that, of the total 1.4 MB of data used between October 31 and November 30, 350 kilobytes (kb) was used for text messages, 1 MB was used for picture messages, and 50 kb was used for other data. In addition, the Detailed Usage Listing 220 displays a breakdown of the charges for each data type.

In some embodiments, the mobile phone 200 may be owned by or otherwise associated with a small business owner and/or a network service provider. As such, an owner of the mobile phone 200 may be able to track the usage of the network by each of the users of the mobile phone 200 based on the usage information attributed to each of the user accounts 232a-232c and displayed via the display 210. In addition, each user of the mobile phone 200 may be able to view his current usage information and the associated charges. However, the network usage application may be configured to only allow a user to view the usage information for the user account corresponding to that user, for example, using the authentication techniques described above.

It is to be understood that, although illustrated in FIG. 2B with reference to particular types of usage information, the usage information 232a may include other types of usage information, such as dialed phone numbers, a number of sent and/or received calls, a number of sent and/or received text messages, a number of sent and/or received picture messages, and/or times of the usage, which may be used to calculate current charges and/or to bill the users of the mobile phone 200. In addition, although illustrated as being simultaneously presented on the display 210 in FIG. 2B, the Usage Summary 215 and/or the Detailed Usage Listing 220 may be independently presented on the display 210, for example, responsive to receipt of a user request via the keypad 205, the navigation keys 280, and/or other components of the user interface 255.

Referring again to FIG. 2A, in some embodiments, the mobile phone 200 may be associated with a plurality of broadcast identifiers that may be used to uniquely identify the mobile phone 200 within the network. For example, the broadcast identifiers may be mobile identification numbers (MINs) stored in the memory 230 of the mobile phone 200. Each of the broadcast identifiers may be associated with a different one of the user accounts 232a-232c and/or the users of the mobile phone 200, such as the users 105a-105c of FIG. 1. As such, the mobile phone 200 may be configured to broadcast a different one of the broadcast identifiers based on the current user of the mobile phone 200. More particularly, the controller 240 may be configured to activate one of the broadcast identifiers associated with the mobile phone 200 based on the identifying information for the current user received via the user interface 255, and the transceiver 225 may be configured to broadcast the activated broadcast identifier during usage of the network. Thus, a network entity, such as the BSC 118 of FIG. 1, may automatically attribute the usage of the network to one of the user accounts based on the broadcast identifier that is broadcast from the mobile phone 200 at a time of and/or during the usage. As such, the network entity may automatically calculate charges for the user accounts 232a-232c based on the usage attributed to the user accounts 232a-232c, and may bill the corresponding users of the mobile phone 200 accordingly.

Although FIGS. 2A and 2B illustrate exemplary mobile phones that may be used to track usage of a network by a plurality of users of the mobile phone, it will be understood that the present invention is not limited to such configuration, but is intended to encompass any configuration capable of carrying out the operations described herein. For example, although the memory 230 and the controller 240 are illustrated as separate components, the memory 230 or portions thereof may be included as part of the controller 240. In addition, although illustrated as a mobile phone 200 including an antenna 265 and a transceiver 225 configured to receive radio frequency signals, some of the functionality of the mobile phone 200 may, in some embodiments, be carried out by one or more stationary and/or otherwise non-mobile network devices, such as a remote server that is configured to receive and transmit signals via a wired connection to a wide-area network. More generally, while particular functionalities are shown in particular blocks by way of illustration, functionalities of different blocks and/or portions thereof may be combined, divided and/or eliminated.

Figure 3:
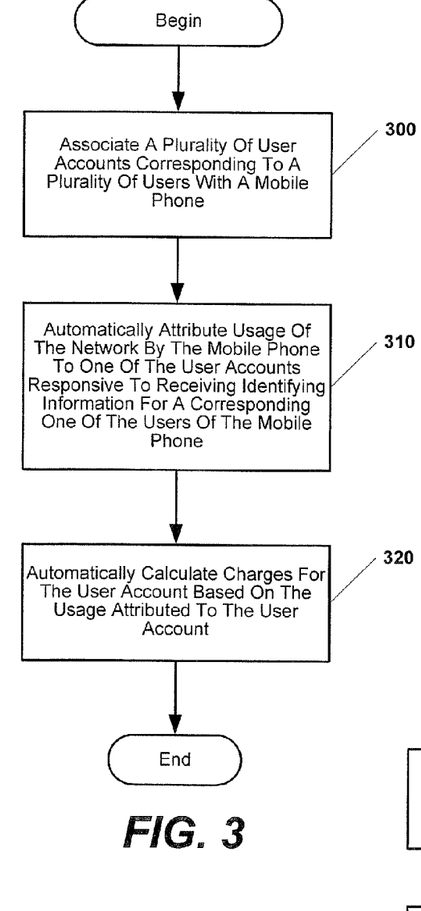
FIG. 3 is a flowchart illustrating operations for tracking usage of a network by a plurality of users of a mobile phone according to some embodiments of the present invention.

Exemplary operations for tracking usage of a network by a plurality of users of a mobile phone according to some embodiment of the present invention will now be described with reference to the flowcharts of FIGS. 3 and 4. FIG. 3 illustrates exemplary operations that may be performed by a mobile phone, such as the mobile phone 125 of FIG. 1, and/or a network entity, such as the server 115 of FIG. 1. Referring now to FIG. 3, a plurality of user accounts are associated with a mobile phone that is shared by a plurality of users at Block 300. For example, user account data for each of the user accounts may be stored in a memory device within the mobile phone and/or at a remote network location. Each of the user accounts may correspond to a different one of the users of the mobile phone.

At Block 310, usage of the network by the mobile phone is automatically attributed to one of the user accounts responsive to receiving identifying information for a corresponding one of the users of the mobile phone. For example, a log on request including the identifying information may be received from a current user of the mobile phone via a user interface of the mobile phone, and the current user may be authenticated based on the identifying information. As such, usage of the network that occurs after the authentication of the current user may be automatically attributed to the corresponding user account. More particularly, one or more wireless wide-area network communication connections may be established after the authentication of the current user, and usage units associated with the communication connection(s) may be automatically attributed to the corresponding one of the user accounts. In addition, a log off request may be received from the current user of the mobile phone via the user interface of the mobile phone, and the usage of the network that occurs between receiving the log on request and receiving the log off request may be automatically attributed to the corresponding user account.

Still referring to FIG. 3, charges for the corresponding one of the user accounts are automatically calculated based on the usage attributed to each user account at Block 320. For example, the charges may be automatically calculated based on usage units representing the usage of the communication connection(s) and a predetermined pricing scheme. The usage units may be based on a number of sent and/or received calls, a number of sent and/or received text messages, a number of sent and/or received picture messages, an amount of sent and/or received data, and/or the time(s) and/or duration(s) of the wireless communication connection(s). The pricing scheme may include a network traffic component, which may be based on a network tariff rate determined by the network provider, and a profit component, which may be determined by the owner of the mobile phone. The network tariff rate may be downloaded from the network, for example, at predetermined times and/or responsive to receiving a user request. For instance, the network tariff rate may be a variable rate that depends on the time of the usage. In addition, the calculated charges and/or usage information based on the usage units may be displayed, for example, for billing purposes.

Figure 4:
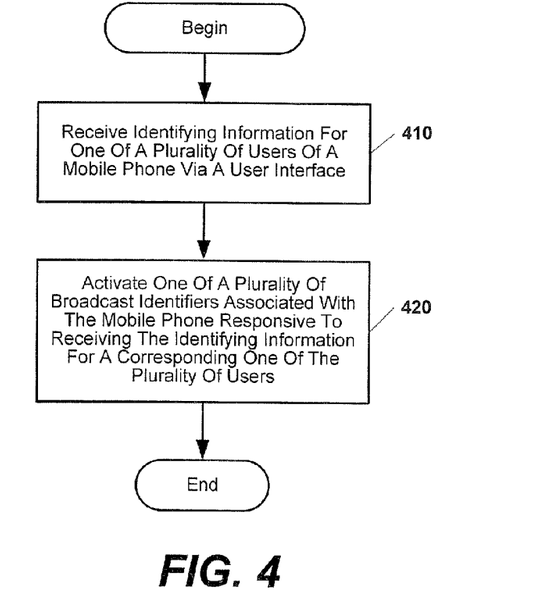
FIG. 4 is a flowchart illustrating operations for tracking usage of a network by a plurality of users of a mobile phone according to further embodiments of the present invention.

FIG. 4 is a flowchart illustrating additional operations that may be performed by a mobile phone, such as the mobile phone 125 of FIG. 1, according to some embodiments of the present invention. Referring now to FIG. 4, identifying information for one of a plurality of users of the mobile phone is received via a user interface of the mobile phone at Block 410. For example, the identifying information may be received from a current user of the mobile phone as part of a log on request, and the current user may be authenticated based on the identifying information.

Responsive to receiving the identifying information, one of a plurality of broadcast identifiers associated with the mobile phone is activated at Block 420. The broadcast identifiers may be used to uniquely identify the mobile phone within the network. For example, the broadcast identifiers may be mobile identification numbers (MINs) stored in the memory of the mobile phone. Each of the broadcast identifiers may be associated with a different one of the users of the mobile phone and/or a corresponding one of the user accounts associated with the mobile phone. As such, a broadcast identifier corresponding to the current user of the mobile phone may be broadcast by the mobile phone based on the identifying information received from the current user. For example, where the broadcast identifiers are MINs, the one of the MINs that is associated with the current user of the mobile phone may be broadcast, so as to identify the mobile phone as currently associated with a particular one of the users and/or user accounts. Thus, usage of the mobile phone may be attributed to a particular user and/or user account based on the broadcast identifier that is broadcast from the mobile phone at a time of the usage.

The flowchart and schematic diagrams of FIGS. 1-4 illustrate the architecture, functionality, and operations of some embodiments of methods, devices, systems, and computer program products for tracking usage of a network by a plurality of users of a mobile phone. In this regard, each block may represent a module, segment, or portion of code, which comprises one or more executable instructions for implementing the specified logical function(s). It should also be noted that in other implementations, the function(s) noted in the blocks may occur out of the order noted in the figures. For example, two blocks shown in succession may, in fact, be executed substantially concurrently or the blocks may sometimes be executed in the reverse order, depending on the functionality involved.

As will be appreciated by one of skill in the art, the present invention may be embodied as a method, system, device, and/or computer program product. Accordingly, the present invention may take the form of an entirely hardware embodiment, a software embodiment, and/or an embodiment combining software and hardware aspects all generally referred to herein as a "circuit" or "module." Furthermore, the present invention may take the form of a computer program product on a computer-usable storage medium having computer-usable program code embodied in the medium. Any suitable computer readable medium may be utilized including hard disks, CD-ROMs, optical storage devices, a transmission media such as those supporting the Internet or an intranet, or magnetic storage devices.

Computer program code for carrying out operations of the present invention may be written in an object oriented programming language such as Java®, Smalltalk or C++, a conventional procedural programming languages, such as the "C" programming language, or lower-level code, such as assembly language and/or microcode. The program code may execute entirely on a single processor and/or across multiple processors, as a stand-alone software package or as part of another software package. The program code may execute entirely on a mobile phone or only partly on the mobile phone and partly on one or more other devices. In the latter scenario, the other devices may be connected to the multimedia device through a wired and/or wireless wide area network (WAN), or the connection may be made to an external computer (for example, through the Internet using an Internet Service Provider). In some embodiments, the program code may also execute either partly or entirely on a remote device.

Furthermore, the present invention was described in part above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks. It should be noted that, in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved.

In the drawings and specification, there have been disclosed exemplary embodiments of the invention. Although specific terms are employed, they are used in a generic and descriptive sense only and not for purposes of limitation, the scope of the invention being defined by the following claims.

That which is claimed:

1. A method for tracking usage of a network by a plurality of users of a mobile phone, the method comprising:
   associating a plurality of user accounts with the mobile phone, wherein each of the plurality of user accounts corresponds to a different one of the plurality of users of the mobile phone;
   receiving a first log-on request provided by a first one of the plurality of users of the mobile phone;
   receiving a second log-on request provided by a second one of the plurality of users of the mobile phone;
   establishing respective wireless wide-area network communication connections as being associated with one of first and second ones of the plurality of user accounts;
   storing usage units associated with the respective wireless wide-area network communication connections established by the mobile phone, the usage units including corresponding times of the communication connections;
   automatically attributing usage of the network by the mobile phone to the first and second ones of the plurality of user accounts responsive to the first and second log-on requests, respectively, by correlating the stored usage units for the communication connections to the first and second ones of the plurality of user accounts based on respective times of receipt of the first and second log-on requests and the times of the communication connections; and
   automatically calculating respective charges for the first and second ones of the plurality of user accounts based on the usage attributed to the first and second ones of the plurality of user accounts,
   wherein the first and second log-on requests include identifying information for the first and second ones of the plurality of users, respectively, and wherein establishing the respective wireless wide-area network communication connections as being associated with one of the first and second ones of the plurality of user accounts comprises:
   receiving one of the first and second log-on requests including the identifying information from a current user of the mobile phone via a user interface of the mobile phone;

authenticating the current user as one of the first and second ones of the plurality of users based on the identifying information;

establishing the respective wireless wide-area network communication connections including the respective usage units associated therewith as being associated with the one of the first and second ones of the plurality of user accounts corresponding to the current user; and then receiving a log off request from the current user of the mobile phone via the user interface of the mobile phone, wherein automatically attributing the usage comprises automatically attributing a sum of the usage units between receiving the one of the first and second log-on requests and receiving the log off request to the corresponding one of the first and second ones of the plurality of user accounts as the usage of the network.

2. The method of claim 1, wherein the mobile phone is configured to provide voice transmission over the wireless wide-area network communication connection.

3. The method of claim 2, wherein the mobile phone is further configured to provide the voice transmission based on a Global System for Mobile communications (GSM).

4. The method of claim 1, wherein the usage units comprises a number of sent and/or received calls, a number of sent and/or received text messages, a number of sent and/or received picture messages, an amount of sent and/or received data, and/or a time of and/or duration of the communication connection.

5. The method of claim 1, wherein authenticating the current user comprises:
preventing use of the mobile phone responsive to a failure in authenticating the current user as one of the first and second ones of the plurality of users.

6. The method of claim 1, further comprising:
storing respective usage information based on the usage units attributed to the first and second ones of the plurality of user accounts.

7. The method of claim 1, further comprising:
displaying respective usage information based on the usage units attributed to the first and second ones of the plurality of user accounts and/or the charges for the first and second ones of the plurality of user accounts.

8. The method of claim 1, wherein automatically calculating the charges comprises:
automatically calculating the respective charges for the first and second ones of the plurality of user accounts based on the usage units attributed to the first and second ones of the plurality of user accounts and a predetermined pricing scheme including a network traffic component determined by a network service provider and a profit component determined by an owner of the mobile phone different from the plurality of users thereof.

9. The method of claim 8, wherein the predetermined pricing scheme includes a predetermined network tariff rate, and wherein automatically calculating the respective charges further comprises:
downloading the predetermined network tariff rate; and
calculating the respective charges based on the predetermined network tariff rate.

10. The method of claim 1, wherein at least one of the first and second ones of the plurality of user accounts is associated with a pre-paid spending limit, and further comprising:
preventing further usage of the network by the mobile phone when the charges for the at least one of the first and second ones of the plurality of user accounts are greater than or equal to the pre-paid spending limit.

11. The method of claim 1, wherein the mobile phone is associated with a plurality of different broadcast identifiers respectively corresponding to ones of the plurality of user accounts, and further comprising:
broadcasting a first one of the plurality of broadcast identifiers corresponding to the first one of the plurality of user accounts responsive to receiving the first log-on request at the mobile phone; and
broadcasting a second one of the plurality of broadcast identifiers corresponding to the second one of the plurality of user accounts responsive to receiving the second log-on request at the mobile phone.

12. The method of claim 1, wherein the mobile phone is associated with a plurality of different broadcast identifiers respectively corresponding to ones of the plurality of user accounts, and wherein automatically attributing the usage comprises:
automatically attributing the usage of the network to one of the first and second ones of the plurality of user accounts responsive to broadcast of a corresponding one of the plurality of broadcast identifiers from the mobile phone at a time of the usage.

13. The method of claim 1, further comprising:
billing the first and second ones of the plurality of user accounts associated with the mobile phone based on the usage attributed to the first and second ones of the plurality of user accounts.

14. A system for tracking usage of a network by a plurality of users of a mobile phone, wherein the system is configured to carry out the method of claim 1.

15. A computer program product for tracking usage of a network by a plurality of users of a mobile phone, the computer program product comprising:
a non-transitory computer readable storage medium including computer readable program code therein configured to carry out the method of claim 1.

16. A mobile phone, comprising:
a transceiver configured to establish wireless wide-area network communication connections;
a user interface configured to receive a first log-on request from a first one of a plurality of users of the mobile phone and a second log-on request from a second one of the plurality of users of the mobile phone;
a memory unit configured to store usage units associated with the wireless wide-area network communication connections established by the mobile phone, the usage units including corresponding times of the communication connections; and
a controller configured to associate a plurality of user accounts with the mobile phone wherein each of the plurality of user accounts corresponds to a different one of the plurality of users, automatically attribute usage of a network by the mobile phone to first and second ones of the plurality of user accounts responsive to receiving the first and second log-on requests from the first and second ones of the plurality of users, respectively, by correlating the stored usage units for the communication connections to the first and second ones of the plurality of user accounts based on respective times of receipt of the first and second log-on requests and the times of the communication connections, and automatically calculate respective charges for the first and second ones of the plurality of user accounts based on the usage attributed to the connections of the plurality of user accounts,
wherein the user interface is further configured to receive one of the first and second log-on requests including identifying information from a current user of the mobile phone and is configured to receive a log off request from the current user of the mobile phone, and wherein the controller is configured to authenticate the current user as one of the first and second ones of the plurality of users based on the identifying information, establish the respective wireless wide-area network communication connections including the respective usage units associated therewith as being associated with one of the first and second ones of the plurality of user accounts corresponding to the current user, and automatically attribute a sum of the usage units between receipt of the one of the first and second log-on requests and receipt of the log off request to the corresponding one of the first and second ones of the plurality of user accounts as the usage of the network.

17. The mobile phone of claim 16, wherein the mobile phone is configured to provide voice transmission over the communication connection.

18. The mobile phone of claim 17, wherein the mobile phone is further configured to provide the voice transmission based on a Global System for Mobile communications (GSM).

19. The mobile phone of claim 16, wherein the usage units comprises a number of sent and/or received calls, a number of sent and/or received text messages, a number of sent and/or received picture messages, an amount of sent and/or received data, and/or a time of and/or duration of the communication connection.

20. The mobile phone of claim 16, wherein the controller is further configured to prevent use of the mobile phone if the controller is unable to authenticate the current user as one of the first and second ones of the plurality of users.

21. The mobile phone of claim 16, wherein the memory unit is further configured to store respective user account data for the first and second ones of the plurality of user accounts including usage information based on the usage units attributed to the first and second ones of the plurality of user accounts.

22. The mobile phone of claim 16, wherein the user interface is configured to display respective usage information based on the usage units attributed to the first and second ones of the plurality of user accounts and/or is configured to display the respective charges for the first and second ones of the plurality of user accounts.

23. The mobile phone of claim 16, wherein the controller is further configured to automatically calculate the respective charges for the first and second ones of the plurality of user accounts based on the usage units attributed to the first and second ones of the plurality of user accounts and a predetermined pricing scheme including a network traffic component determined by a network service provider and a profit component determined by an owner of the mobile phone different from the plurality of users thereof.

24. The mobile phone of claim 23, wherein the predetermined pricing scheme includes a predetermined network tariff rate, wherein the transceiver is configured to download the predetermined network tariff rate, and wherein the controller is configured to automatically calculate the charges based on the predetermined network tariff rate.

25. The mobile phone of claim 21, wherein the memory unit is configured to store a pre-paid spending limit associated with at least one of the first and second ones of the plurality of user accounts, and wherein the controller is configured to prevent further usage of the network by the mobile phone when the charges for the at least one of the first and second ones of the plurality of user accounts are greater than or equal to the pre-paid spending limit.

26. The mobile phone of claim 16, wherein the mobile phone is associated with a plurality of different broadcast identifiers respectively corresponding to the plurality of user accounts, and wherein the controller is configured to broadcast a first one of the plurality of broadcast identifiers corresponding to the first one of the plurality of user accounts via the transceiver responsive to receiving the first log-on request, and broadcast a second one of the plurality of broadcast identifiers corresponding to the second one of the plurality of user accounts via the transceiver responsive to receiving the second log-on request.

* * * * *